US007809210B2

United States Patent
Lou

(10) Patent No.: US 7,809,210 B2
(45) Date of Patent: Oct. 5, 2010

(54) SMART GREY LEVEL MAGNIFIER FOR DIGITAL DISPLAY

(75) Inventor: Wang-He Lou, Tustin, CA (US)

(73) Assignee: Mitsubishi Digital Electronics America, Inc., Irvine, CA (US)

( * ) Notice: Subject to any disclaimer, the term of this patent is extended or adjusted under 35 U.S.C. 154(b) by 905 days.

(21) Appl. No.: 11/609,821

(22) Filed: Dec. 12, 2006

(65) Prior Publication Data

US 2008/0137984 A1 Jun. 12, 2008

(51) Int. Cl.
*G06K 9/40* (2006.01)
*G06T 5/00* (2006.01)

(52) U.S. Cl. .................... 382/274; 358/3.27

(58) Field of Classification Search .......... 382/168, 382/169, 233, 254, 273, 274, 275, 276, 298; 358/1.2, 3.27, 521, 522, 528; 345/603, 660
See application file for complete search history.

(56) References Cited

U.S. PATENT DOCUMENTS

| 5,184,183 | A  | * | 2/1993 | Karidis et al. ............ 399/231 |
| 5,389,506 | A  | * | 2/1995 | Sutton ..................... 430/509 |
| 7,404,645 | B2 | * | 7/2008 | Margulis ................... 353/31 |
| 7,508,993 | B2 | * | 3/2009 | Yuan et al. ................ 382/274 |
| 2007/0035706 | A1 | * | 2/2007 | Margulis ................. 353/122 |
| 2007/0172145 | A1 | * | 7/2007 | Altunbasak et al. ........ 382/274 |

* cited by examiner

*Primary Examiner*—Kanji Patel
(74) *Attorney, Agent, or Firm*—Orrick, Herrington & Sutcliffe LLP

(57) ABSTRACT

Systems and methods are provided that facilitate grey level magnification to improve details and contrast for a dark scene of video on a digital display system. Preferably implemented over a limited pixel level range, the video enhancement process counts the number of pixels corresponding to each level within the range in a frame and then, based on the percent level distribution of the pixels, calculates the stack of percentage distribution. From the stack of percentage distribution, a transformation process is performed to reassign the pixel values over a dark level range and to expand the distribution of the pixels. The result of transformation enhances the details and contrast of the dark area significantly without affecting the bright scene. By only applying the algorithm to dark scenes, computation loads are reduced compared with some of the full picture processing methods. Lower computational loads are important to reduce motion artifacts in high speed video applications.

20 Claims, 7 Drawing Sheets

SMART GREY LEVEL MAGNIFIER FOR DIGITAL DISPLAY

FIELD

The present invention relates generally to digital display devices, and more particularly to a grey level magnifier for digital video signals in a digital display device.

BACKGROUND

Digital display devices, which include liquid crystal display (LCD), LCD projection, liquid crystal on silicon (LCoS), plasma display panel (PDP), etc., tend to lack details in the dark areas or dark scenes of the displayed image. More particularly, digital displays are limited in their overall grey levels making it difficult to show shades of grey. For example, an 8 bit resolution display is limited to a maximum of 256 levels. Because of this limitation, the grey levels in the dark area are usually hard to distinguish.

Generally, traditional histogram equalization can be used to enhance the picture quality, but not without drawbacks. With traditional histogram equalization, the entire picture is affected, including, unnecessarily, the bright area of the picture. As a result, the noise level tends to increase and the computing load tends to be quite heavy in real time video. It may cause motion artifacts and picture flash because of the heavy computing loads associated with histogram equalization. Hence others have turned to simple gamma correction, which requires less computing time than histogram equalization, to improve the digital display. Consumers, however, remain unsatisfied with the results of these correction methods.

Therefore, it would be desirable to provide a system and method that enhances the picture quality in the dark areas of an image on a digital display.

SUMMARY

An improved system and method that facilitates picture quality enhancement in the dark scenes or dark image areas of a digital display is provided herein. In accordance with a preferred method, the picture enhancement is only implemented in areas of the display in which it is necessary, i.e., those areas lacking details such as the dark areas of the image on a digital display. As a result, the equalization computations are applied to a limited or partial range of pixel levels from the overall range of pixel levels, which significantly reduces the computation time, typically in the range of about ⅛ to ¼ of full histogram equalization computation. Since the image enhancement method is applied to a partial pixel level range, it maintains the high fidelity of the overall image and reduces the occurrence of artifacts typical of normal histogram equalization.

In a preferred embodiment, the image enhancing system includes programmable logic in the form of executable software stored in memory contained within a controller, an integrated circuit of the controller, an application specific integrated circuit (ASIC) chip installed in the controller, or the like.

Preferably, the image enhancing process of the system is implemented over a limited pixel level range, counting the number of pixels corresponding to each level within the range, and then, based on the percent level distribution of the pixels, expands the distribution of the pixels or reassigns the level of the pixels over a defined pixel level range.

Other objects and features of the present invention will become apparent from consideration of the following description taken in conjunction with the accompanying drawings.

DESCRIPTION OF THE DRAWINGS

The details of the invention, both as to its structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

DETAILED DESCRIPTION

Figure 1:
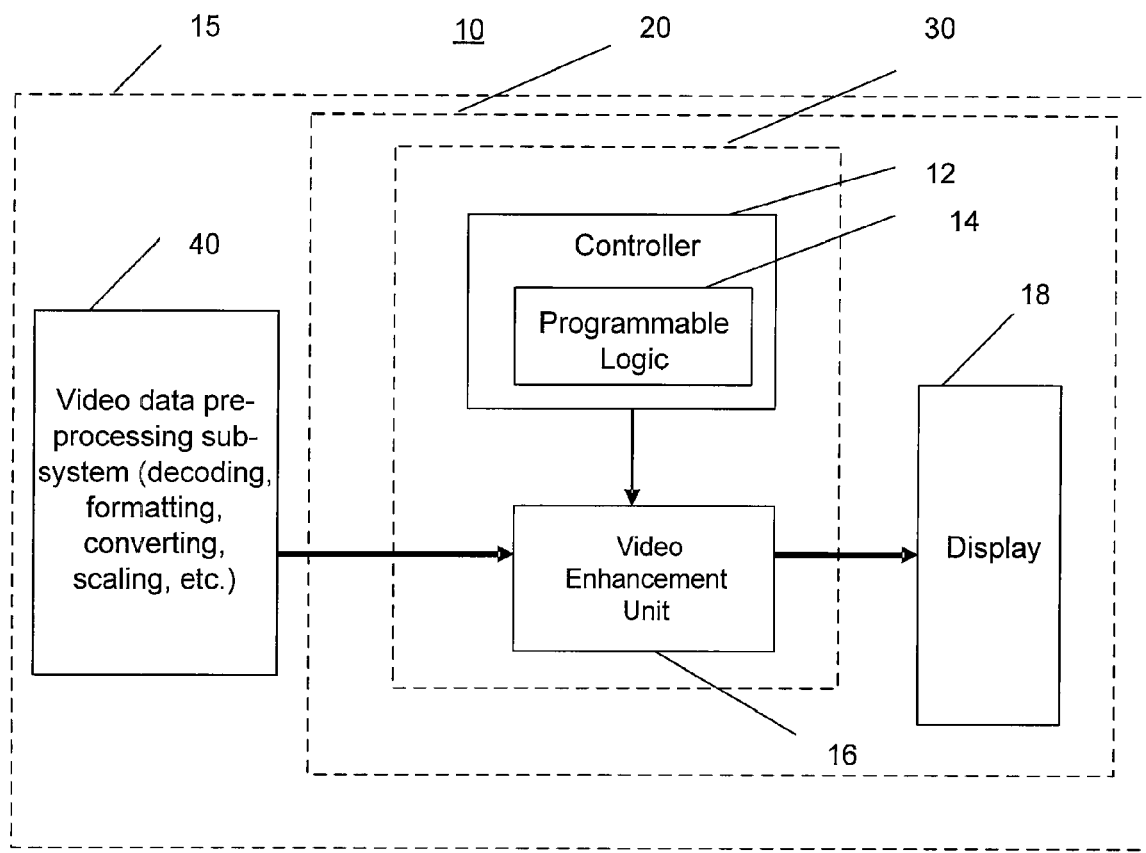
FIG. 1 is a block diagram of an image enhancement system.
Figure 2:
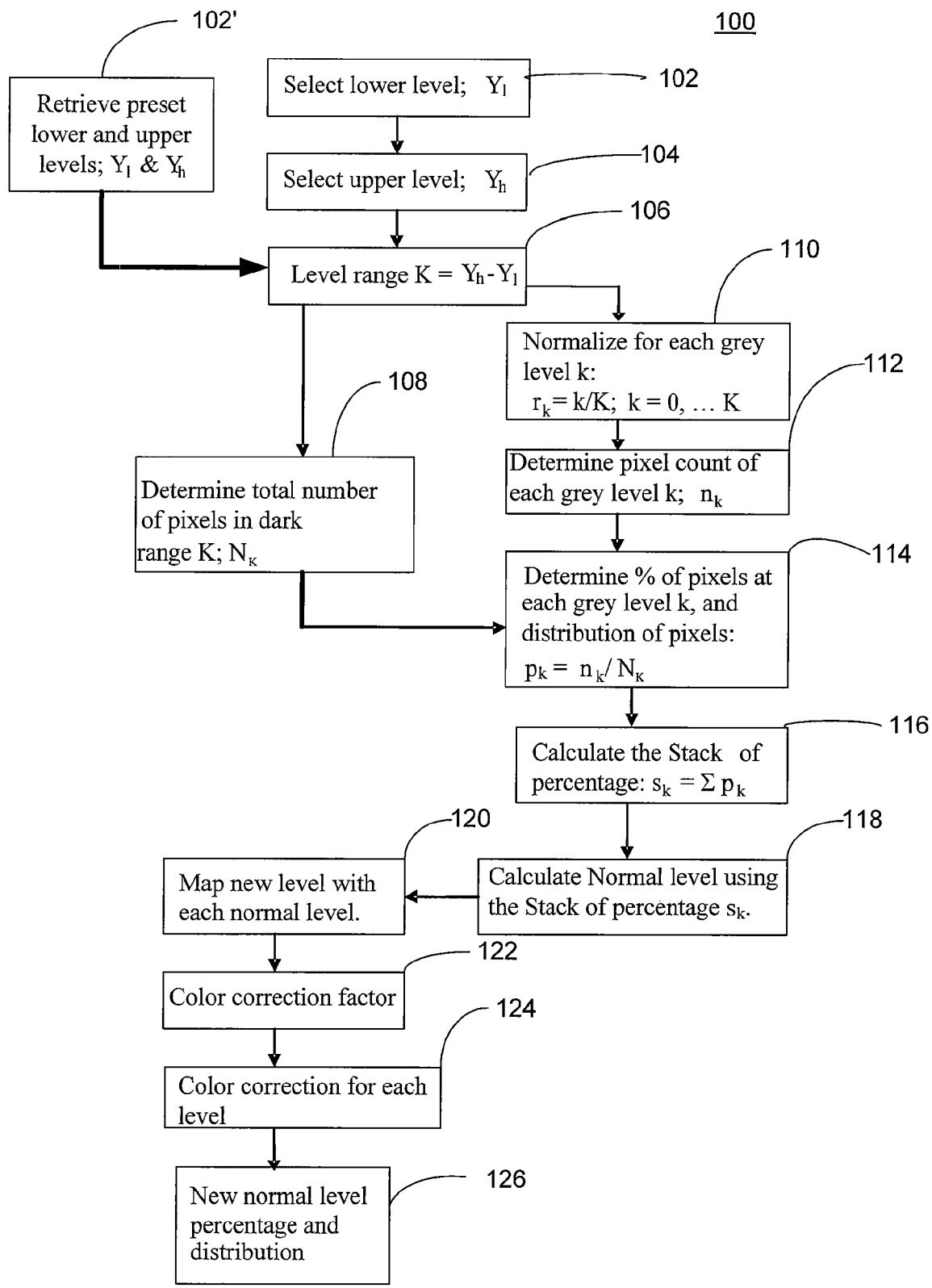
FIG. 2 is a flow chart illustrating the image enhancement process.

Each of the additional features and teachings disclosed below can be utilized separately or in conjunction with other features and teachings to provide an improved system and method that enhances the picture quality in the dark areas of a digital display. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

An improved system and method that enhances the picture quality in the dark image areas of a digital display is provided herein. In accordance with a preferred method, the picture enhancement is only implemented in areas of the display in which it is necessary, i.e., those areas lacking details such as the dark areas of the image on a digital display. Because it is not necessary to enhance the picture in the bright image areas of the digital display, the preferred method focuses on the dark image areas and performs equalization in the dark pixel level range. As a result, the equalization computations are applied to a limited or partial range of pixel levels from the overall range of pixel levels, which significantly reduces the computation time, typically in the range of about ⅛ to ¼ of full histogram equalization computation. This significant reduction in computation time facilitates implementation of the enhancement method in real time video. Since the image enhancement method is applied to a partial pixel level range, it maintains the high fidelity of the overall image and reduces the occurrence of artifacts typical of normal histogram equalization.

As shown in FIG. 1, the Digital Video Processing system 10 includes a controller 12 comprising programmable logic 14, a video enhancement unit 16 coupled to a display 18 and the controller 12, and a video data pre-processing sub-system 40, from which the video data is transmitted, coupled to the video enhancement unit 16. The video data pre-processing sub-system 40 performs the functions such as decoding, format converting and scaling etc. The Digital Video Processing system 10 can be a part of a digital display system comprising a digital display device such as a LCD device, a LCOS device, a PDP device, or the like. Thus, as one of skill in the art will readily recognize, the Digital Video Processing system 10 can be embodied in a number of different configurations including (a) a video pre-processor 40, a controller 12 and video enhancement unit 16 coupled to a screen or display 18, (b) a video pre-processor 40 and a video enhancement device 30 coupled to a display 18, (c) a video data pre-processor 40 and a digital display device 20 such as a computer with a display 18, (d) a digital display device such as a television 15, and the like. Further, as one of skill in the art will readily recognize, the programmable logic 14 can be in the form of executable software stored in memory contained in the controller, an integrated circuit of the controller, an application specific integrated circuit (ASIC) chip installed in the controller, and the like.

The dark area image enhancer method or grey level magnifier method provided herein is a flexible, non-linear process that facilitates the expansion of detail in dark area of a digital display image. In addition to being non-linear, the process can be adjusted by different colors to meet the color tracking requirement of the digital display system or device. For examples, the target specification of R, G, B transforms can be different according to the color tracking and can be different according to display devices: i.e., PDP, LCD, etc.

In operation, the parameters are adjusted according to statistical characteristics. Implemented over a limited pixel level range, the image enhancement method counts the number of pixels corresponding to each level within the range and then based on the percent level distribution of the pixels, expands the distribution of the pixels or reassigns the pixel value over pixel level range.

Turning to FIGS. 2 through 5, a preferred embodiment of the dark area image enhancing method 100, which can be referred to as a percentage stack mapping method, is described. At steps 102 and 104, the value of $Y_l$ and $Y_h$ is selected. In a preferred embodiment, "Y" represents the pixel level or pixel value. In the Y Pr Pb color space, "Y" is the value of the Y, Pr, or Pb components of a single pixel. In the RGB color space, "Y" is the value of the R, G, or B components of a single pixel. Depending on the particular digital display device, the highest and lowest values for "Y", i.e., $Y_{max}$ and $Y_{min}$, are known or can be defined by device specifications. $Y_l$ generally equals $Y_{min}$. The following equation can be used to calculate $Y_l$:

$$Y_l = u * Y_{min} \qquad (1)$$

where u>=(greater than or equal to) 1. The $Y_h$ is selected according to the display device or video enhancement requirement. The following equation can be used to calculate $Y_h$:

$$Y_h = v * Y_{max} \qquad (2)$$

where v<(less than 1) is a variable that is dependent on display device type, such as PDP, LCD, and others. This variable is preferably set in a register. Normally, the user can set it as a constant once the system is selected. The value v can be adjustable by video sources or other factors if necessary.

As indicated at step 102', as an alternative, preset values for $Y_l$ and $Y_h$ can be stored in the system and retrieved. The criterion for selecting pre-set values is to set the value of $Y_l$ to the lowest pixel level and set the value of $Y_h$ to the highest pixel level of the dark area that affects the visible details. The higher the value of $Y_h$, the larger the calculation. Thus, a lower $Y_h$ is preferred to improve processing speed.

As an example, the grey level range is presumed to be from level 0 to level 255. An assumption can be made that the grey level from level 0 to level 32 is the range that affects the details of the digital display. Accordingly, the lower and upper levels of Y will be selected at 0 and 32. If some application needs to select for Y from 10 to 64, then $Y_l$ and $Y_h$ can be preset at 10 and 64, respectively. Advantageously, more than one set of $Y_l$ and $Y_h$ can be selected with each set of $Y_l$ and $Y_h$ representing one grey level magnifier. In a TV application, several different magnifiers can be set with the consumer being able to enable or disable the grey level magnifier based on the signal source or viewing preference. For digital display devices, the detail is lost in dark grey areas. Therefore, it is most useful to select the range of magnification in the dark image area.

Once $Y_h$ and $Y_l$ are selected or determined, the dark area pixel level range is calculated at step 106 using equation (3):

$$K = Y_h - Y_l \qquad (3)$$

The dark area pixel level range, K, relates to the effective dark area and process speed.

At step 110, each grey pixel level, k, is normalized across the dark area pixel level range, K, using equation (4):

$$r_k = k/K \qquad (4)$$

Figure 3:
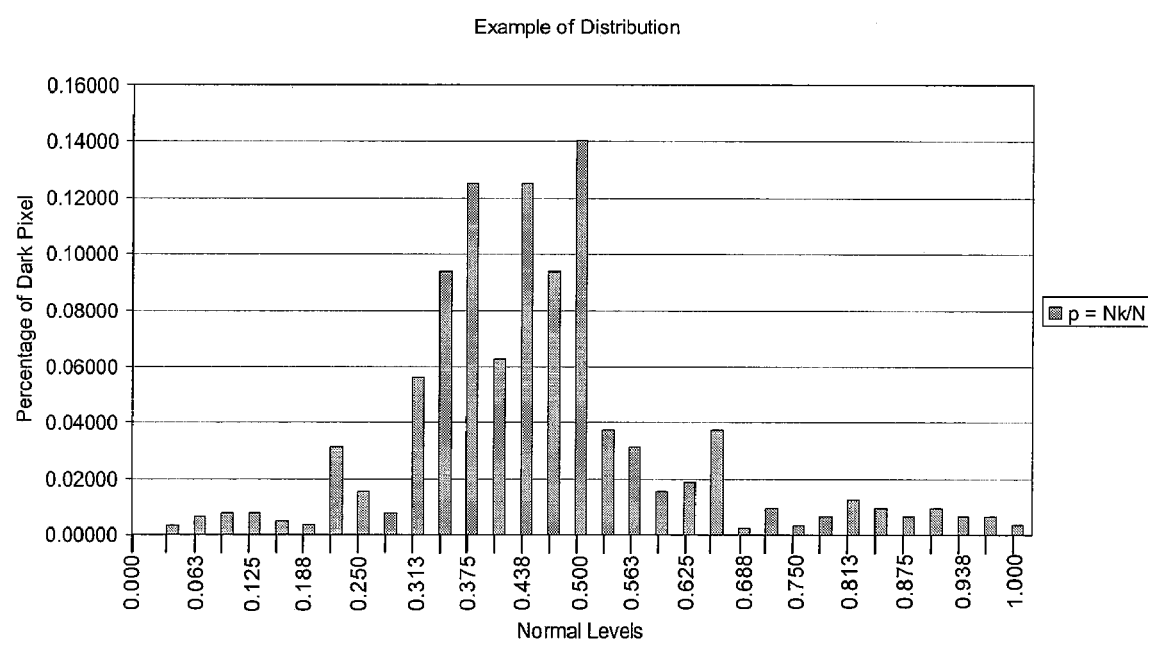
FIG. 3 is a chart illustrating the percent distribution of pixels of a normalized pixel level range for example.

The normalized grey level, $r_k$, is always less than or equal to 1, i.e., $r_K = K/K = 1$. The example above, where the critical grey levels are assumed to be from level 0 to level 32, is illustrated in FIG. 3. As shown, the 0 on the X or horizontal axis corresponds to grey level 0 and the 1 on the X or horizontal axis corresponds to grey level 32.

Next, at step 112, the total number of pixels, $n_k$, at each grey pixel level, k, in the dark area, is counted or determined.

At step 114, the percent (%) of pixels, $p_k$, at each grey level, k, is calculated as follows:

$$p_k = n_k/N_K \qquad (5)$$

where $N_K$, which is the total number of pixels in the dark area pixel level range, K, is counted or determined at step 108. FIG. 3 illustrates the percent distribution of pixels in the dark area pixel level range, K.

At step 116, the transfer function is calculated as the stack of percentages, $s_k$, as follows:

$$s_k = \Sigma p_k \qquad (6)$$

Figure 4:
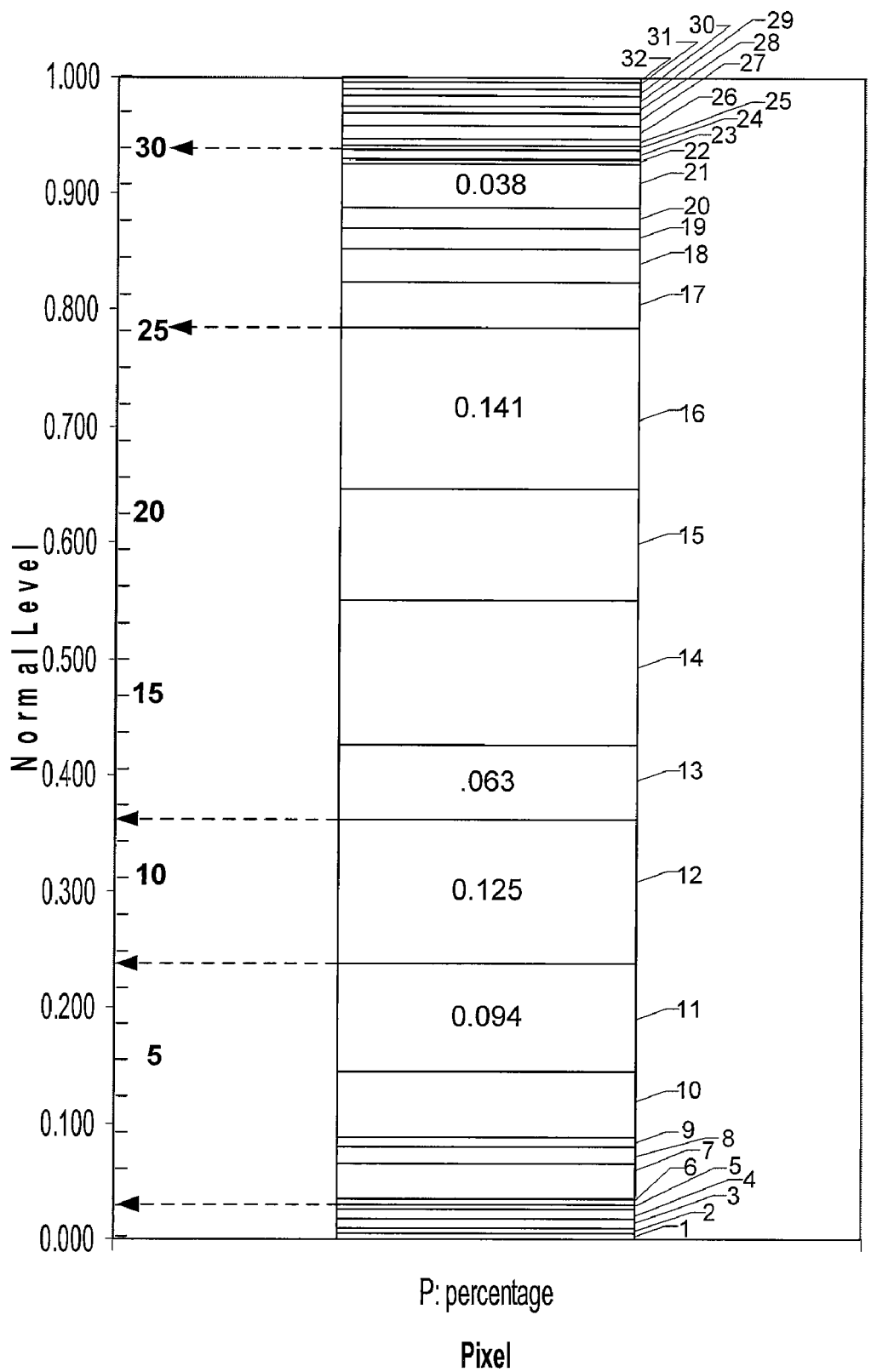
FIG. 4 is a chart illustrating percentage stack mapping of the pixel distribution.
Figure 5:
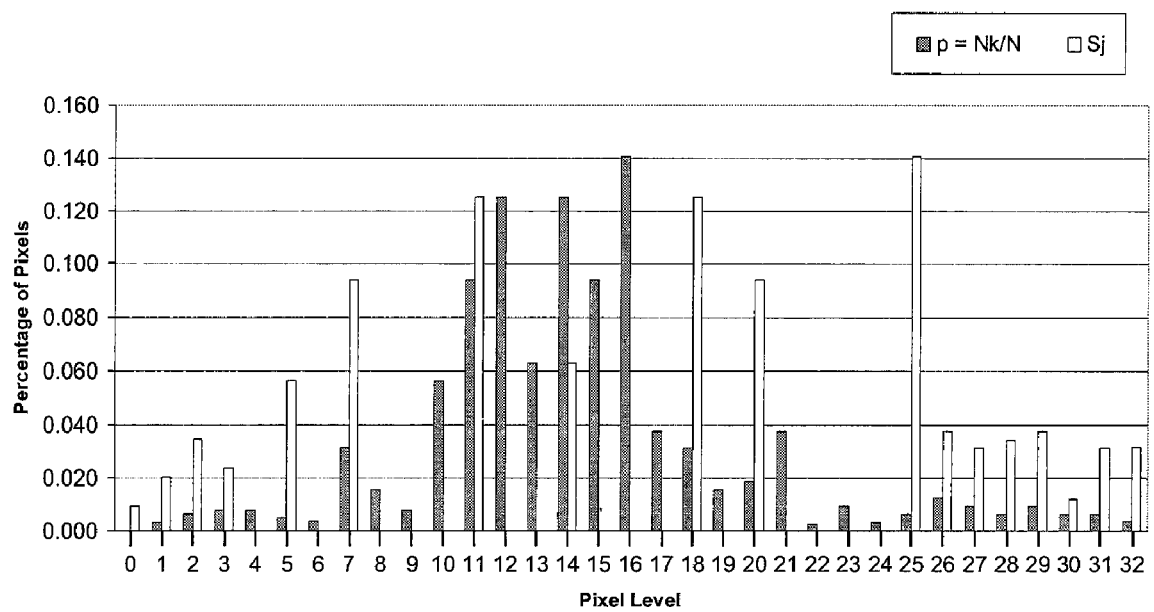
FIG. 5 is a chart illustrating the percent distribution of pixels mapped to new pixel levels.

As shown in FIG. 4, all of the percentages related to the grey levels are added together in a stack of the chart. In the chart, each block corresponds to the percentage of pixels at each original pixel level. The original pixel level is indicated to the right of the block. The number appearing in certain blocks is a decimal representation of the block percentage. The larger the block is, the higher the percentage of the pixel at original level. At Step 118, the percentages are normalized along the vertical axis (see scale on the left of the vertical axis). The normalized pixel level range, or normal level range, is then equally divided into new pixel levels, k, corresponding to the original pixel level range, K (i.e., 0-32), as indicated by the scale on the right of the vertical axis in FIG. 4.

At step 120, the equivalent stack levels are mapped to the new normal pixel levels. Depending on the stack block size, a stack level may include several stack blocks that combine and map to one normal pixel level or one stack block that jumps or traverses several normal pixel levels. In the chart, the original level 16, which has a block percentage of 0.141, jumps or traverses several normal pixel levels and is mapped to normal pixel level 25. The blocks corresponding to original pixel levels 29 to 32 combine to map to a single normal pixel level, i.e., level 32.

This percentage stack mapping can result in some loss of detail when several percentage stack blocks merge and map to a single normal level. In order to minimize this effect, the normal level range can be increased to 2K, 4K or more. The step or distance between levels is then refined from 1/K to 1/(2K), 1/(4K) and the like. The refinement of step size prevents the loss of detail.

By assigning or mapping the stack block to new normal pixel level and, thus, expanding the pixel distribution over the dark level range, i.e., relocating or re-assigning pixels corresponding to the stack block to the new normal pixel level, the contrast and detail of the video will improve dramatically. Further improvement of the video can be accomplished through color correction.

Figure 6:
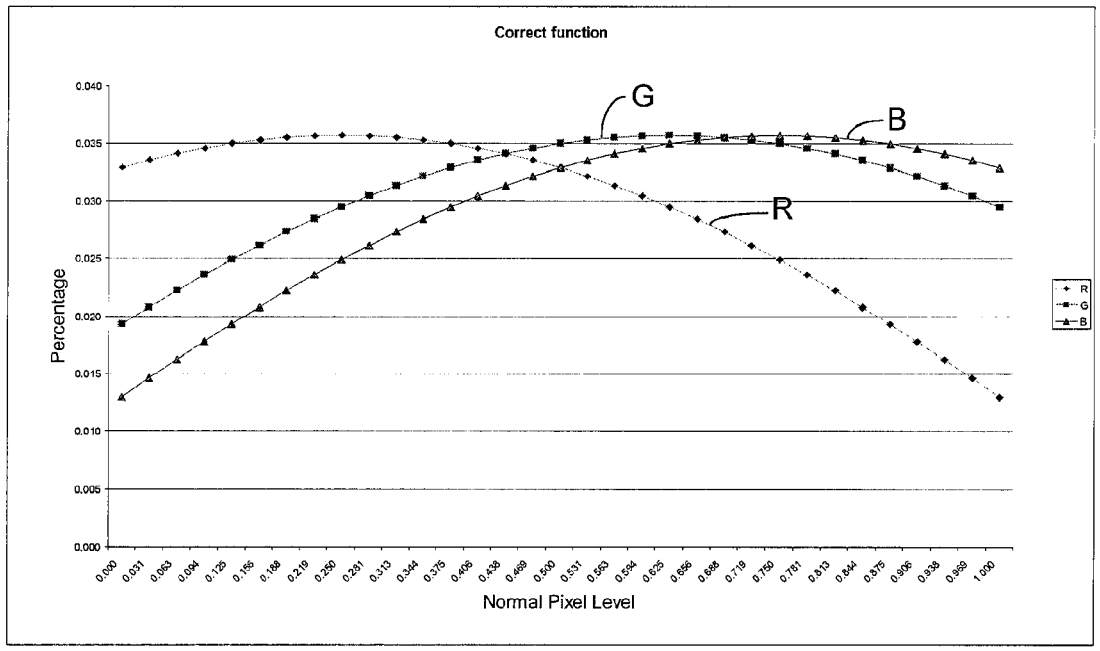
FIG. 6 is a chart illustrating the statistical characteristics of the RGB pixel components over a normalized pixel level range.

For RGB pixel components in the dark area, the response, as shown in FIG. 6, is not linear and proportional. When the brightness changes, the colors will shift slightly. Each display device (LCD, LCOS, PDP etc.) possesses different color characteristic. The statistical characteristics can be measured, for example, as indicated by the chart in FIG. 6, and then used to calculate the normal correction factor. (see FIG. 7).

Figure 7:
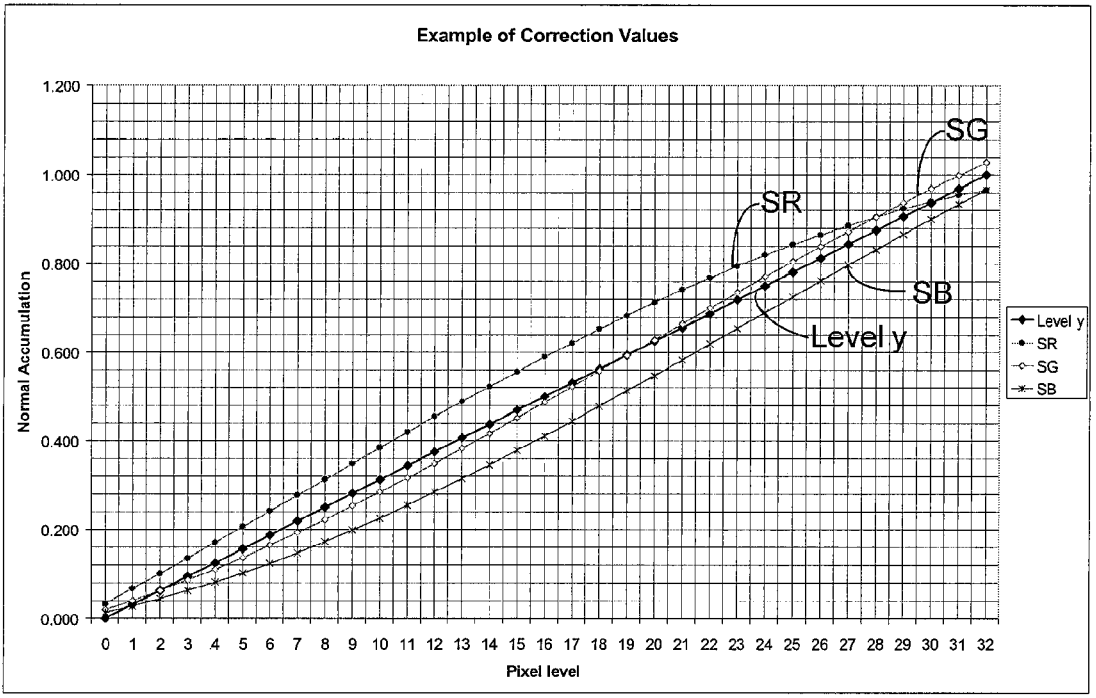
FIG. 7 is a chart illustrating the normalized accumulation of the offset of RGB components over a pixel level range.

The correction curves can be calculated from the different color characteristics shown in FIG. 6. In FIG. 7, SR curve can be obtained by accumulating the R values in FIG. 6:

$$SR = \Sigma R(i). \qquad (7a)$$

$\Sigma$ is the accumulation operation.

SG curve can be obtained by accumulating the G values:

$$SG = \Sigma G(i). \qquad (7b)$$

SB curve can be obtained by accumulating the B values:

$$SB = \Sigma B(i). \qquad (7c)$$

In FIG. 7, the Y level is the linear line as the reference. The correction parameters ($\Delta r(j)$, $\Delta g(j)$, $\Delta b(j)$) can be obtained as shown in the FIG. 7.

$$SY = \Sigma Y(i). \qquad (7d)$$

$$\Delta r(j) = SY(j) - SR(j) \qquad (8a)$$

$$\Delta g(j) = SY(j) - SG(j) \qquad (8b)$$

$$\Delta b(j) = SY(j) - SB(j) \qquad (8c)$$

The color level after correction will be:

$$SR(j) = Sr(j) + \Delta r(j), \qquad (9a)$$

$$SG(j) = Sg(j) + \Delta g(j), \qquad (9b)$$

$$SB(j) = Sb(j) + \Delta b(j), \qquad (9c)$$

Figure 8:
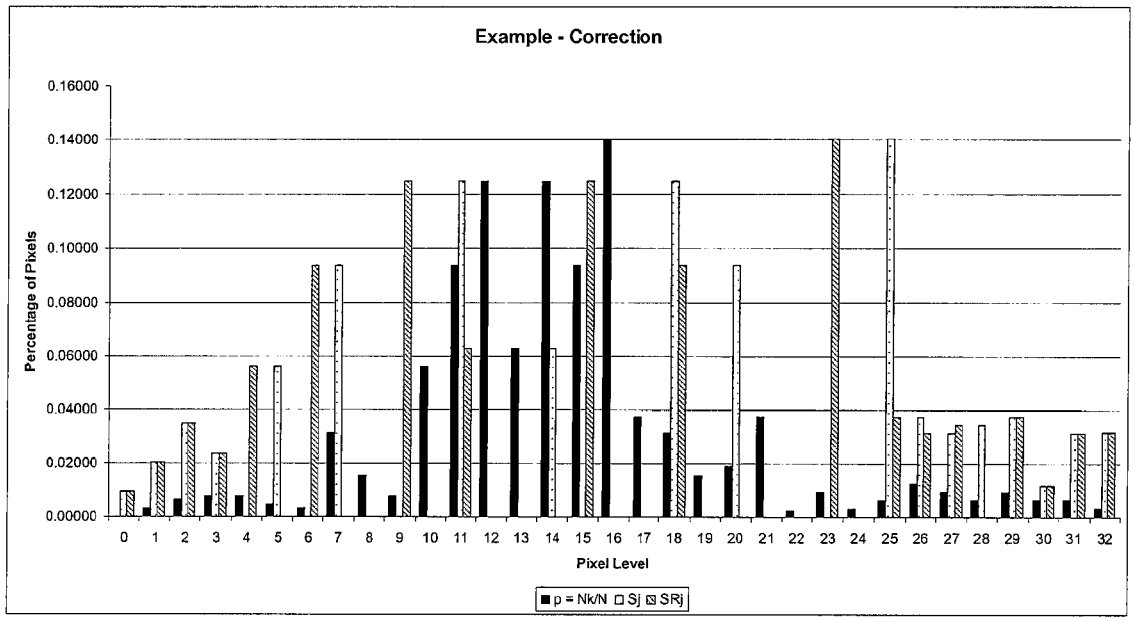
FIG. 8 is a chart illustrating the percent distribution of pixels mapped to new pixel levels with color correction.

The correction of red color is shown in FIG. 8 as example. In the FIG. 8, Sj and SRj correspond to Sr(j) and SR(j), respectively, in the equation (9a). The correction parameters of each color ($\Delta r(j)$, $\Delta g(j)$, $\Delta b(j)$) can be stored in the memory.

At step 122, the color correction factor can be calculated or determined as noted above, or retrieved from memory. At step 124, the normal level of the percentage stack mapping is corrected for each color. At step 126, the new pixel level is assigned for final video (picture), thus distributing the pixels within the dark area. (see FIGS. 8 and 9).

Figure 9:
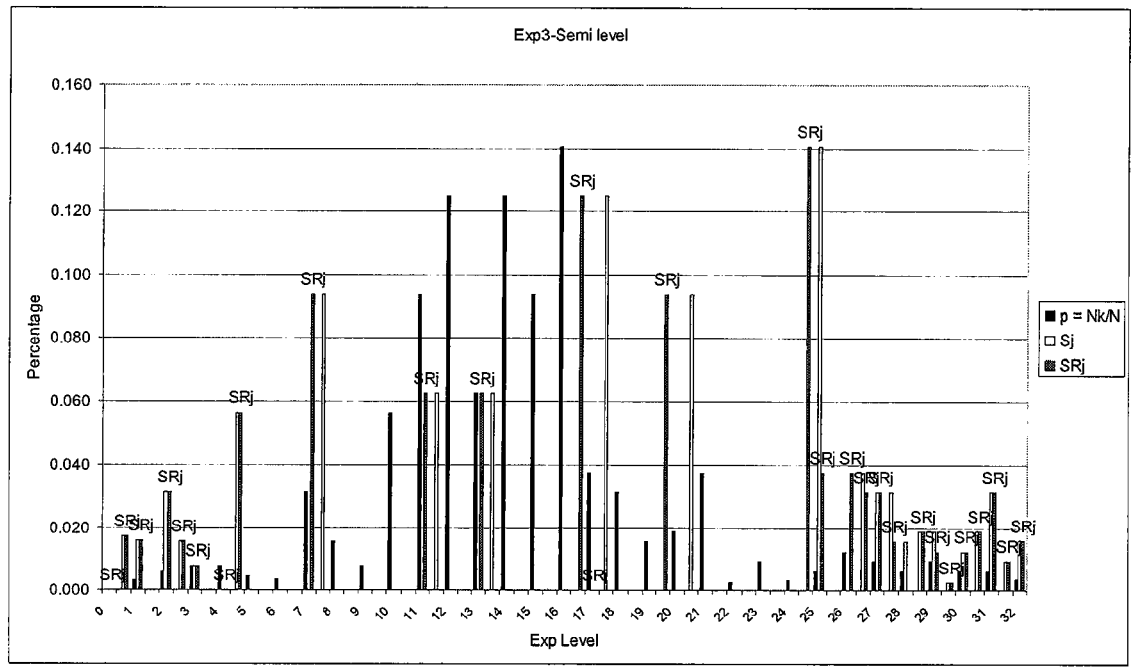
FIG. 9 is a chart illustrating the percent distribution of pixels mapped to new pixel levels with doubled resolution of color correction. The normal levels are expanded to two times.

Usually, percentage stack mapping will result in some lost details when several blocks merge as one normal level. In order to minimize this side effect, the normal levels can be increase to 2 times, 4 times or more. When the normal levels increase 2 times, the grey level steps are refine from 1/K, to 1/(2K) (double levels), 1/(4K). The refinement of grey level step reduces the side effect. As an example, the correction of red color with double levels is shown in FIG. 9, The particular examples set forth herein are instructional and should not be interpreted as limitations on the applications to which those of ordinary skill are able to apply this device. Modifications and other uses are available to those skilled in the art which are encompassed within the spirit of the invention as defined by the scope of the following claims.

What is claimed is:

1. A method for enhancing picture quality in dark image areas of a video image frame displayable on a display screen of a digital display device, the digital display device including a video enhancing unit coupled to the display screen and having a configuration to receive and process image frames of a video signal and output the processed image frames for display on the display screen, comprising the steps of receiving an image frame of a video signal, the image frame having a plurality of pixels distributed over a plurality of pixel levels, determining for a set of pixels in the image frame having a first distribution of pixels across a first plurality of pixel levels within a pre-determined range of grey pixel levels the number of pixels corresponding to individual pixel levels within the pre-determined range of grey pixel levels, expanding the pixel level distribution of the set of pixels from the first distribution of pixels across the first plurality of pixel levels within the pre-determined range of grey pixel levels to a second distribution of pixels across a second plurality of pixel levels within a pre-determined range of grey pixel levels based on a percent level distribution of the set of pixels within the pre-determined range of grey pixel levels, and displaying the image frame with the set of pixels having the second distribution of pixels on the display screen.

2. The method of claim 1 further comprising the step of calculating a pixel level range K as the pre-determined range of grey pixel levels, where $K=Y_h-Y_1$ and $Y_h$ and $Y_1$ are pre-set values corresponding to the highest and lowest pixel level values.

3. The method of claim 1 further comprising the step of calculating a pixel level range K as the pre-determined range of grey pixel levels, where $K=Y_h-Y_1$, where $Y_h$ and $Y_1$ correspond to the highest and lowest pixel level values where $Y_h=v*Y_{max}$ and $Y_1=u*Y_{min}$, and where $v<1$ and $u>1$.

4. The method of claim 1 further comprising the step of normalizing each pixel level across the pre-determined range of grey pixel levels.

5. The method of claim 1 wherein the step of expanding the pixel level distribution of set of pixels includes calculating the percentage of pixels out of the set of pixels at each pixel level within pre-determined range of grey pixel levels.

6. The method of claim 5 wherein the step of expanding the pixel level distribution of set of pixels includes calculating a stack of the percentage of the pixels out of the set of pixels at each pixel level within pre-determined range of grey pixel levels.

7. The method of claim 6 wherein the expanding the pixel level distribution of set of pixels includes normalizing the pixel level range to the stack of percentages.

8. The method of claim 7 wherein the step of expanding the pixel level distribution of set of pixels includes mapping each stack level comprising one or more stack blocks within the stack of percentages to a normalized pixel level within the normalized pixel range and reassigning pixels corresponding to a stack block within the stack level to the normalized pixel level.

9. The method of claim 8 further comprising the step of applying a color correction factor to the expanded distribution of pixels.

10. A method for enhancing picture quality in dark image areas of a video image frame displayable on a display screen of a digital display device, the digital display device including a video enhancing unit coupled to the display screen and having a configuration to receive and process image frames of a video signal and output the processed image frames for display on the display screen, comprising the steps of receiving an image frame of a video signal, the image frame having a plurality of pixels distributed over a plurality of pixel levels, counting the number of pixels out of a set of pixels in the image frame having a first distribution of pixels across a first plurality of pixel levels within a pre-determined range of grey pixel levels corresponding to individual pixel levels within the pre-determined range of grey pixel levels, calculating a stack of percentage distribution of the set of pixels based on a percent level distribution of the pixels within the pre-determined range of grey pixel levels expanding the pixel level distribution of the set of pixels from the first distribution of pixels across the first plurality of pixel levels within the pre-determined range of grey pixel levels to a second distribution of pixels across a second plurality of pixel levels within a pre-determined range of grey pixel levels based on a stack percentage distribution of the set of pixels within the pre-determined range of grey pixel levels, and displaying the image frame with the set of pixels having the second distribution of pixels on the display screen.

11. The method of claim 10 further comprising the step of calculating a pixel level range K as the predetermined range of grey pixel levels, where $K=Y_h-Y_1$ and $Y_h$ and $Y_1$ are pre-set values corresponding to the highest and lowest pixel level values.

12. The method of claim 10 further comprising the step of calculating a pixel level range K as the predetermined range of grey pixel levels, where $K=Y_h-Y_1$, where $Y_h$ and $Y_1$ correspond to the highest and lowest pixel level values where $Y_h=v*Y_{max}$ and $Y_1=u*Y_{min}$, and where $v<1$ and $u>1$.

13. The method of claim 10 further comprising the step of normalizing each pixel level across the predetermined range of grey pixel levels.

14. The method of claim 10 wherein the step of calculating a stack of percentage distribution of pixels includes calculating percentage of the pixels out of the set of pixels at each pixel level within pre-determined range of grey pixel levels.

15. The method of claim 14 wherein the step of calculating a stack of percentage distribution of pixels includes summing the percentage of percentage of the pixels out of the set of pixels at each pixel level within pre-determined range of grey pixel levels.

16. The method of claim 15 wherein the step of expanding the pixel level distribution of set of pixels includes normalizing the pixel level range to the stack of percentages.

17. The method of claim 16 wherein the step of expanding the pixel level distribution of set of pixels includes dividing the normalized pixel level range into normalized pixel levels corresponding to the pixel levels in the predetermined pixel level range.

18. The method of claim 17 wherein the step of expanding the pixel level distribution of set of pixels includes mapping stack levels comprising one or more percentage stacks within the stack of percentages to a normalized pixel level within the normalized pixel range and reassigning pixels corresponding to a percentage stack within the stack level to the normalized pixel level.

19. The method of claim 18 further comprising the step of applying a color correction factor to the expanded distribution of pixels.

20. The method of claim 10 further comprising the step of applying a color correction factor to the expanded distribution of pixels.

* * * * *